United States Patent
Suzuki et al.

(10) Patent No.: US 6,828,742 B2
(45) Date of Patent: Dec. 7, 2004

(54) POWER SUPPLYING APPARATUS AND METHOD FOR VEHICLE DRIVE DEVICE TO BE CONTROLLED USING CONTROL UNIT

(75) Inventors: Minoru Suzuki, Saitama (JP); Yutaka Tamagawa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/392,393

(22) Filed: Mar. 20, 2003

(65) Prior Publication Data
US 2004/0026140 A1 Feb. 12, 2004

(30) Foreign Application Priority Data
Mar. 28, 2002 (JP) ......................................... 2002-090560

(51) Int. Cl.[7] ................................................. H02P 3/00
(52) U.S. Cl. ......................... 318/139; 318/140; 701/22; 180/65.2; 180/65.3
(58) Field of Search ................................. 318/139, 140; 180/65.2, 65.3; 701/22

(56) References Cited

U.S. PATENT DOCUMENTS

| | | | | |
|---|---|---|---|---|
| 5,994,789 A | * | 11/1999 | Ochiai ........................ | 307/10.1 |
| 6,002,221 A | * | 12/1999 | Ochiai et al. ................ | 318/139 |
| 6,329,772 B1 | * | 12/2001 | Ochiai et al. ................ | 318/139 |
| 6,336,612 B1 | * | 1/2002 | Taormina et al. ......... | 244/158 R |
| 6,427,100 B1 | * | 7/2002 | Kaku et al. .................... | 701/22 |
| 6,435,294 B1 | * | 8/2002 | Hara et al. .................. | 180/65.4 |
| 6,484,075 B2 | * | 11/2002 | Hasegawa et al. ............ | 701/22 |
| 6,488,107 B1 | * | 12/2002 | Ochiai et al. .............. | 180/65.2 |
| 6,501,241 B1 | * | 12/2002 | Tsurumi et al. ............. | 318/432 |
| 2001/0053950 A1 | * | 12/2001 | Hasegawa et al. ............ | 701/22 |

FOREIGN PATENT DOCUMENTS

| JP | 10-224901 | 8/1998 |
|---|---|---|
| JP | 10-304501 | * 11/1998 |

* cited by examiner

*Primary Examiner*—Paul Ip
(74) *Attorney, Agent, or Firm*—Arent Fox PLLC (57) ABSTRACT

A vehicle drive device substantially has a motor and a power supplying apparatus. The power supplying apparatus has a main battery, a sub-battery, a power drive unit, a capacitor, a contactor, and a control unit. Under control by the control unit, misjudgment of failure of precharge contactor owing to a voltage drop of the battery can be prevented from being occurred.

11 Claims, 9 Drawing Sheets

POWER SUPPLYING APPARATUS AND METHOD FOR VEHICLE DRIVE DEVICE TO BE CONTROLLED USING CONTROL UNIT

FIELD OF THE INVENTION

The present invention relates to power supplying apparatus and method for a vehicle drive device that drives an engine or a motor of a hybrid automobile and particularly control operation of precharge contactor for supplying an electric power from a high voltage battery to a capacitor of a power drive unit.

BACKGROUND OF THE INVENTION

Conventionally, a vehicle drive device that drives an engine, a motor of a hybrid automobile and the like, are provided with a high-voltage battery that generates a high voltage and a sub-battery that generates a low voltage for supplying an electric power to auxiliaries such as a starter and the like. The electric power from the high voltage battery is supplied to a motor in way of a contactor serving as an electromagnetic switch and a power drive unit.

The power drive unit includes a switching element such as a transistor or the like, in which a high-capacitance capacitor is connected in parallel with the switching element in order to prevent a voltage from the power supply from being altered, while the switching element is turned on or turned off. Here, electric power from the high voltage battery used for the power drive unit is supplied by opening or closing of the contactor. However, if the contact were immediately on, larger current might be flown into the contactor in order to charge the capacitor and a value of the larger current would be over an allowable current value of the contactor.

Thus, conventionally a precharge contactor is disposed, which is connected in parallel with the main contactor and connected in series with a current-restriction resistor, apart from the main contactor that is directly couples to a power supplying path. When charging the capacitor, firstly the precharge contactor is turned on and secondly after charging of the capacitor is completed, the main contactor is turned on. By such a control procedure using the electric power supplying apparatus, the conventional technology prevents the larger current from being flown into the main contactor. In other words, when charging the capacitor, a signal for closing i.e. turning on the precharge contactor is outputted from the power supplying apparatus, and an electric power is supplied to a drive coil of the precharge contactor, resulting in that the precharge contactor is turned on.

Now, when energizing the engine, a voltage drop of the sub-battery occurs owing to electric consumption by the starter and the like. Even if the power supplying apparatus output an on-command to the precharge contactor, the drive coil might not be sufficiently excited, resulting in that the precharge contactor might not be sometimes on. Therefore, a precharge contactor to be normally activated might not be normally activated, sometimes.

Further, if the temperature of the drive coil of the contactor were extraordinarily risen, current of the coil might not be decreased, so that a magnetic force might not generate only for activating a contact mechanism of the contactor, resulting in that the contact mechanism of the contactor might be not activated. As a conventional countermeasure, Japanese Patent Laid-open No. 10-22490 discloses regarding in that those operational matters might be beforehand informed of e.g. an automobile driver by measuring the temperature of the drive coil of the contactor using a sensor.

According to the disclosure, it has not been relatively easy to directly measure the temperature of the coil of the contactor, because the contactor has been sealed using a casing for water-proof and/or dust proof. Additionally, a whole system might sometimes be likely to be complicated in order to monitor the coil temperature of the contactor sealed using the casing.

SUMMARY OF THE INVENTION

It is an object of the present invention to provide a power supplying apparatus in that the power supplying apparatus used for the vehicle drive device can prevent failure of the precharge contactor from occurring owing to a voltage-drop of the sub-battery while the engine is being energized without intention based on misjudgment. It is another object of the present invention to provide the power supplying apparatus in that the power supplying apparatus used for the vehicle drive device can prevent operational failures of the contactor owing to rising of temperature.

According to an aspect of the present invention, there is provided a power supplying apparatus used for a vehicle drive having: a motor that assists an engine that outputs a driving force to the vehicle and/or drives the vehicle; a first charging device that supplies an electric power to the motor; a main contactor connected between the first charging device and the motor; a precharge circuit including a pre-charge contactor connected in parallel with the main contactor and a current-restriction resistor; a power drive unit including a switching circuit disposed at an input side of the motor in which plural switching elements are connected; a capacitor connected in parallel at an input side of the power drive unit; a second charging device that supplies a drive voltage that is smaller than a voltage of the first charging device at least to a drive coil of the precharge contactor; an intial charging unit for supplying the drive voltage to the drive coil so that a voltage of the capacitor becomes a predetermined value or larger by closing the precharge contactor; and an initial charging retrying unit that retries to execute an initial charging after the initial charging is once stopped and predetermined time elapses if a voltage across the capacitor is less than a predetermined value and if a voltage at the second charging device is a predetermined value or smaller.

In view of the aspect, following effects can be attained. The initial discharging unit supplies the drive voltage at the second charging device to the drive coil, resulting in that the precharge contactor is inactivated and charging operation is executed at a predetermined interval so that the voltage across the capacitor becomes a predetermined value or larger. After charging time by the initial charging unit has elapsed at a predetermined interval, in a case where the voltage across the capacitor is smaller than a predetermined value and the voltage at the second charging device is smaller than a predetermined value and the voltage from the second charging device is a predetermined value or smaller, the initial charging is retried to be executed at a predetermined interval. Accordingly, e.g. if a predetermined value of a voltage at the second charging device is set as a moving voltage which can inactivate the precharge contactor, a voltage drop in the second discharging device occurs while the engine is being energized and the voltage becomes the moving voltage or smaller, resulting in that the precharge contactor is not normally on. Even in such a case, after the voltage is recovered into an original voltage value by the execution of the retry.

BRIEF DESCRIPTION OF THE DRAWINGS

In the accompanying drawings:

FIG. 5 is a flow chart for indicating a control method of driving a cooling fan at the time when an ignition switch is turned on;

FIG. 6 is a timing chart for indicating an effect of execution of retry of the initial charging retrying unit in a case where a voltage drop of the sub-battery occurs at the time when the ignition switch is turned on;

FIG. 7 is a timing chart for indicating an effect of execution of retry of a cooling initial charging unit in a case where the cooling fan is driven at the time when the ignition switch is turned on;

DESCRIPTION OF THE PREFERRED EMBODIMENTS

[First Embodiment]

Figure 2:
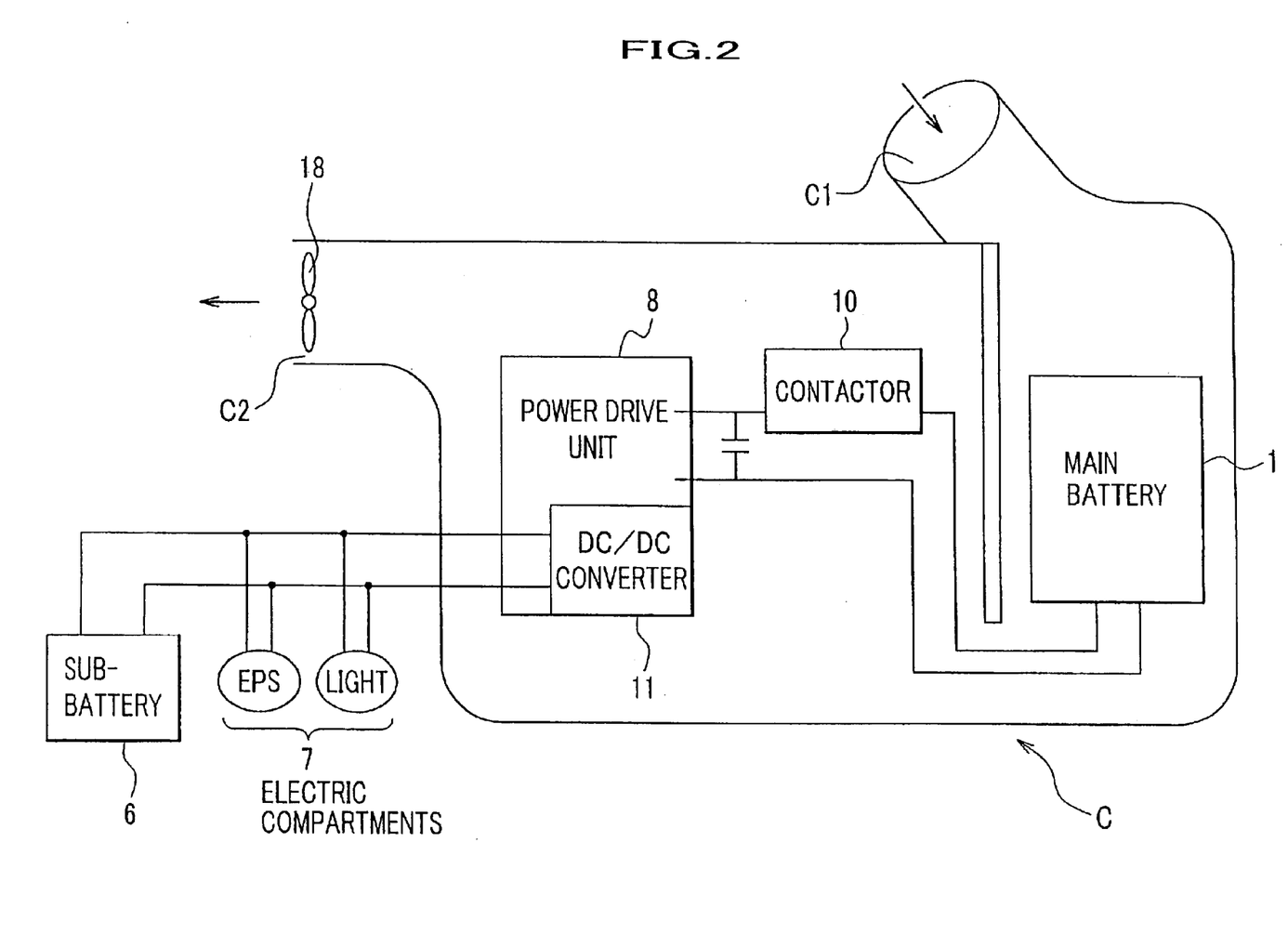
FIG. 2 is a schematic plan view for showing a construction for cooling a power supplying apparatus in FIG. 1.
Figure 3:
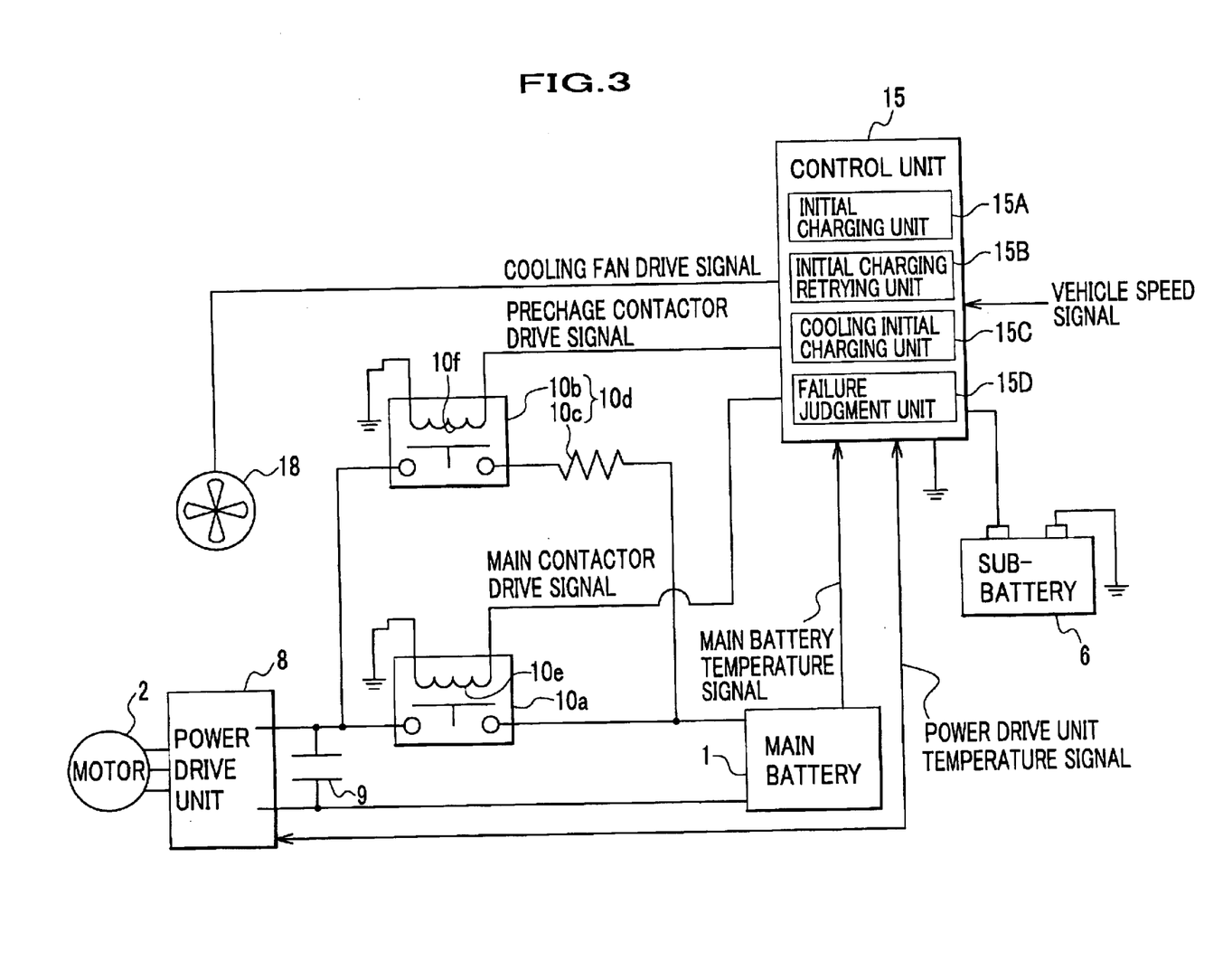
FIG. 3 is a block diagram for showing a block diagram illustrating a main part of the power supplying apparatus in FIG. 1.
Figure 4:
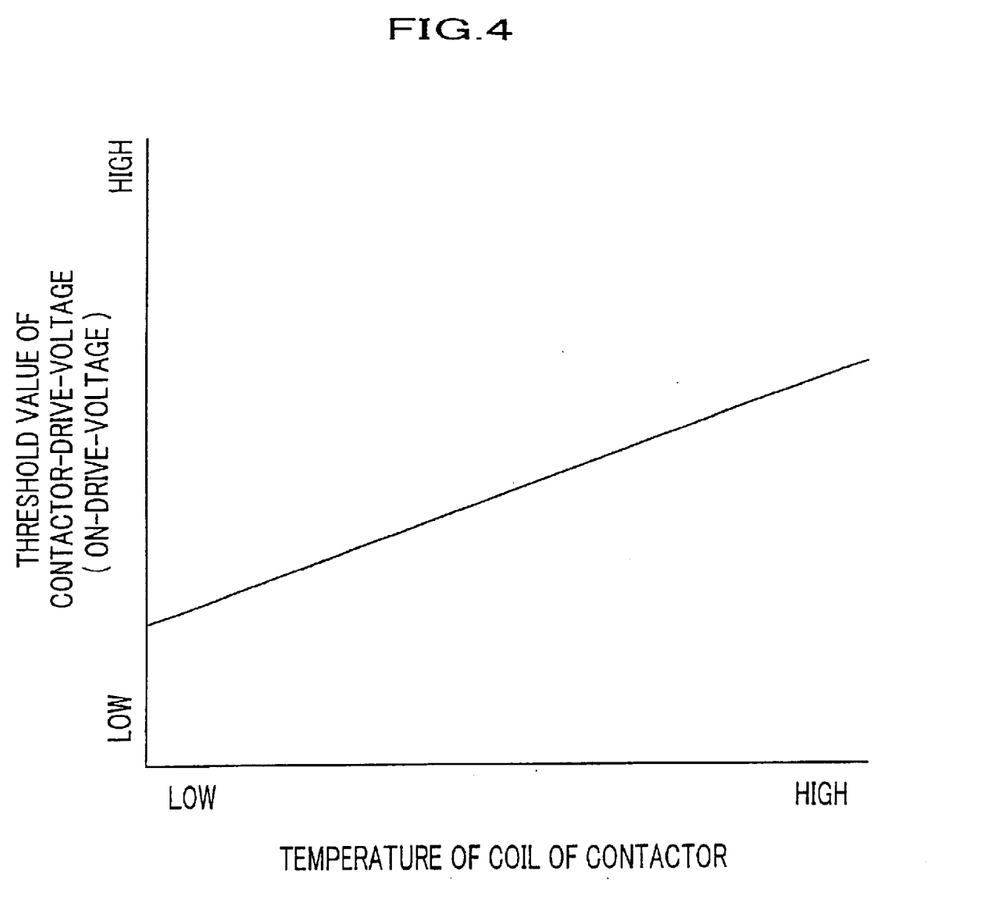
FIG. 4 is a graph for showing characteristics of the contactor in FIG. 1.

It will be explained about details of the first embodiment of power supplying apparatus and method for a vehicle drive device relating to a first embodiment. In the drawings, FIG. 1 is a block diagram for showing a whole vehicle drive device relating to the first embodiment, FIG. 2 is a schematic plan view for showing a construction for cooling the electric power supplying apparatus in FIG. 1, FIG. 3 is a block diagram for showing a block diagram indicating a main part of the power supplying apparatus in FIG. 1, and FIG. 4 is a graph for showing characteristics of the contactor of FIG. 1.

Figure 1:
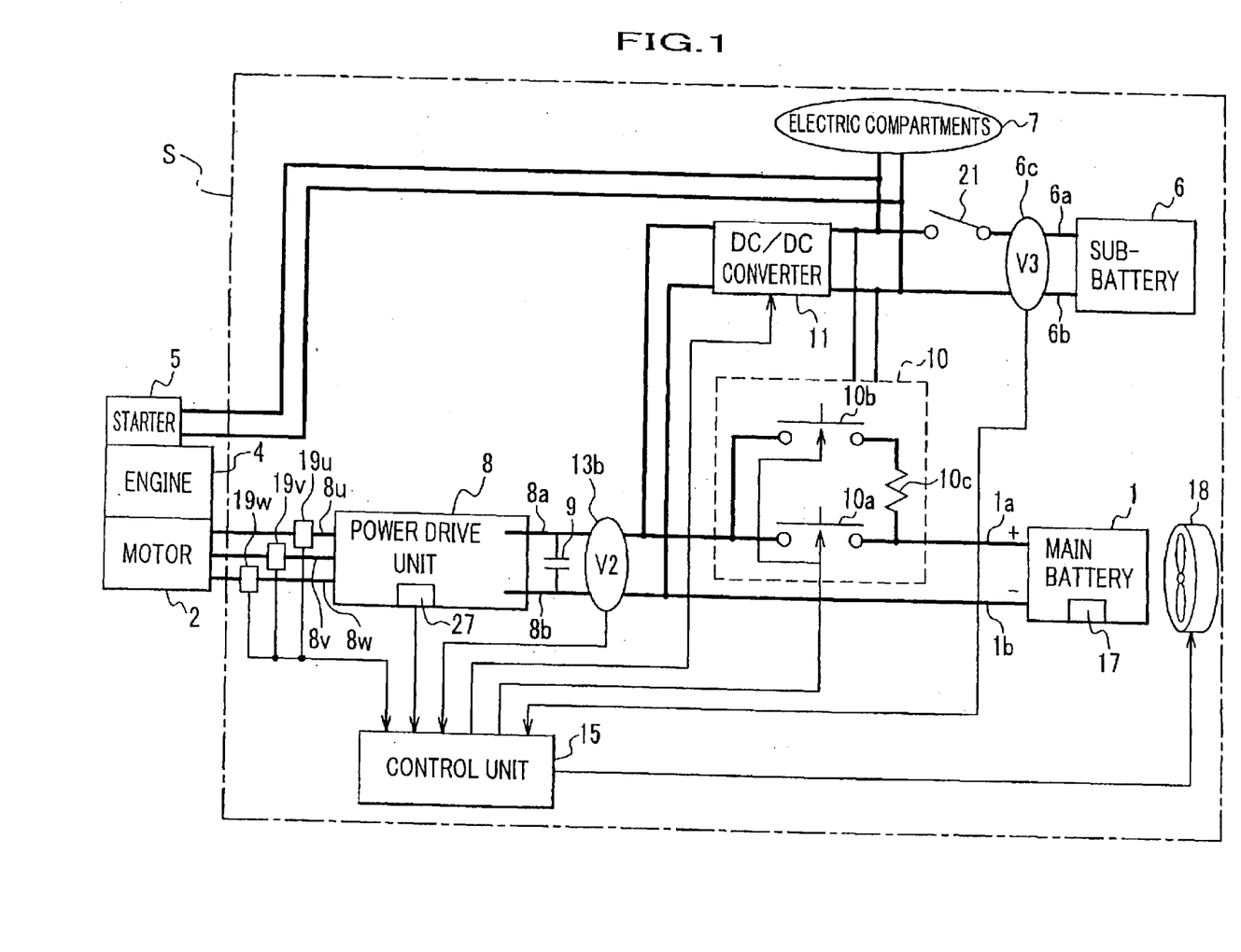
FIG. 1 is a block diagram for showing a whole vehicle drive device relating to a first embodiment.

As shown in FIG. 1, vehicle drive device M is mainly provided with motor 2 that assists engine 4 that outputs a driving force of the vehicle and drives the vehicle, and power supplying apparatus S. Power supplying apparatus S is mainly provided with main battery (first charging device) 1, sub-battery (second charging device) 6, power drive unit 8, capacitor 9, contactor 10, and control unit 15. As shown in FIG. 2, the casing C accommodates main battery 1, power drive unit 8, and contactor 10 and the like for power supplying apparatus S. If cooling fan 18 is driven, air absorbed from air-absorbing inlet C1 for air-communication with an automobile interior room is flown through inside of casing C and exhausted from air-exhausting outlet C2, resulting in that cooling construction is established for cooling apart such as main battery 1 or power drive unit 8.

As shown in FIG. 1, when the vehicle is run using a driving force of motor 2, an electric power is supplied to motor 2. When running speed of the vehicle is reduced or the like, motor 2 is energized as a dynamo, resulting in that electric energy obtained by the electric generating operation is charged. Main battery 1 is constituted so that plural cells are connected in series, forming a single module using these cells and thereafter the single module is connected by plural numbers of modules so as to output a higher voltage (e.g. 144 [V] to 288 [V]). Further, temperature sensor (also called as "temperature detecting unit") 17 is installed to main battery 1. Sub-battery 6 outputs a voltage smaller than main battery 1 does. A voltage whose value is 12 [v] is outputted from positive side terminal 6a and negative side terminal 6b. Voltage sensor 6c that detects output voltage V3 of sub-battery 6, is disposed between positive side terminal 6a and negative side terminal 6b. Positive side terminal 6a is connected to ignition switch 21 for turning on or off power supply from sub-battery 6. Sub-battery 6 supplies an electric power to starter 5 that energizes engine 4, various electric compartments 7 such as a headlight, a defroster, and an air conditioner, contactor 10, control unit 15 and the like.

Power drive unit 8 is disposed at an input side of motor 2, which controls an amount of electric power supplied to motor 2 and an amount of electric power produced from motor 2. Smoothing capacitor 9 is connected in parallel to an input side of power drive unit 8. Capacitor 9 is disposed across positive terminal 8a and negative terminal 8b. Voltage sensor 13b for measuring voltage V2 across capacitor 9 is disposed between positive terminal 8a and negative terminal 8b.

Power drive unit 8 includes an inverter having a switching circuit in which two switching elements are in series connected. The switching circuit is turned on or off using below-mentioned control unit 15. Thereby, a direct current supplied from main battery 1 used for power drive unit 8 is converted into a three-phase alternating current. The converted three-phase alternating current is supplied to motor 2 by way of three phase wires 8u, 8v, and 8w. Three phase wires 8u, 8v, and 8w are respectively provided with each of current sensors 19u, 19v, and 19w for detecting current flown through three phase wires 19u, 19v, and 19w. Power drive unit 8 includes temperature sensor (temperature detecting unit) 27 for detecting temperature of unit 8.

Contactor 10 has a characteristic that a threshold value of a drive voltage which has each of contactors 10a, 10b turned on. In other words, the higher, the temperatures of the drive coils 10e, 10f,(refer to FIG. 3), the higher, the required voltage.

Control unit 15 is mainly provided with an unshown central processing unit (CPU) and necessary memories. Further, control unit 15 is substantially provided with controls motor 2, power drive unit 8, cooling fan 18, DC/DC converter 11, and contactor 10. Specifically, control unit 15 refers to outputs from voltage sensors 6c, 13b and temperature sensors 17, 27 in order to control contactor 10. Furthermore, control unit 15 is provided with an initial charging unit 15A for supplying the drive voltage to drive coil 10f so that a voltage across capacitor 9 becomes a predetermined value or more by closing precharge contactor 10b, and initial charging retrying unit 15B that retries to execute the initial discharging after predetermined time elapses since the initial discharging once pauses in a case where a voltage of sub battery 6 is smaller than a predetermined value in a time for supplying the drive voltage using the initial charging unit 15A. Also, control unit 15 is further provided with a cooling initial charging unit 15C that retries to execute the initial charging if any one of temperatures detected using temperature sensors 17, 27 is lowered down to a predetermined value or if cooling fan 18 is being driven for predetermined time, after a retrying time of execution of initial charging using the initial charging retrying unit is over a predetermined number of times. Also, control unit 15 is provided with a failure judgment unit 15D that judges that precharge contactor 10b is at fault when a voltage across capacitor 9 is below a predetermined value and a voltage of sub-battery 6 is over a predetermined value after predetermined time elapses, the initial charging is retried to be executed by the cooling initial charging unit 15C.

Next, it will be explained about control of contactor 10 using control unit 15, referring to FIG. 5 and FIG. 6. In the first embodiment, note that it will be explained about control of contactor 10 in case where when the above-mentioned ignition switch 21 (refer to FIG. 1) is turned on, the cooling fan drive signal is outputted for driving cooling fan 18 to be outputted from control unit 15.

Initially, if ignition switch 21 is turned on, the cooling fan drive signal is outputted from control unit 15, resulting in that cooling fan 18 is driven using the cooling fan drive signal (refer to FIG. 3). Thereafter, until main contactor 10a is turned on or until control unit 15 judges that precharge contactor 10b is at fault, the routine shown in FIG. 5 is periodically repeated.

Figure 5:
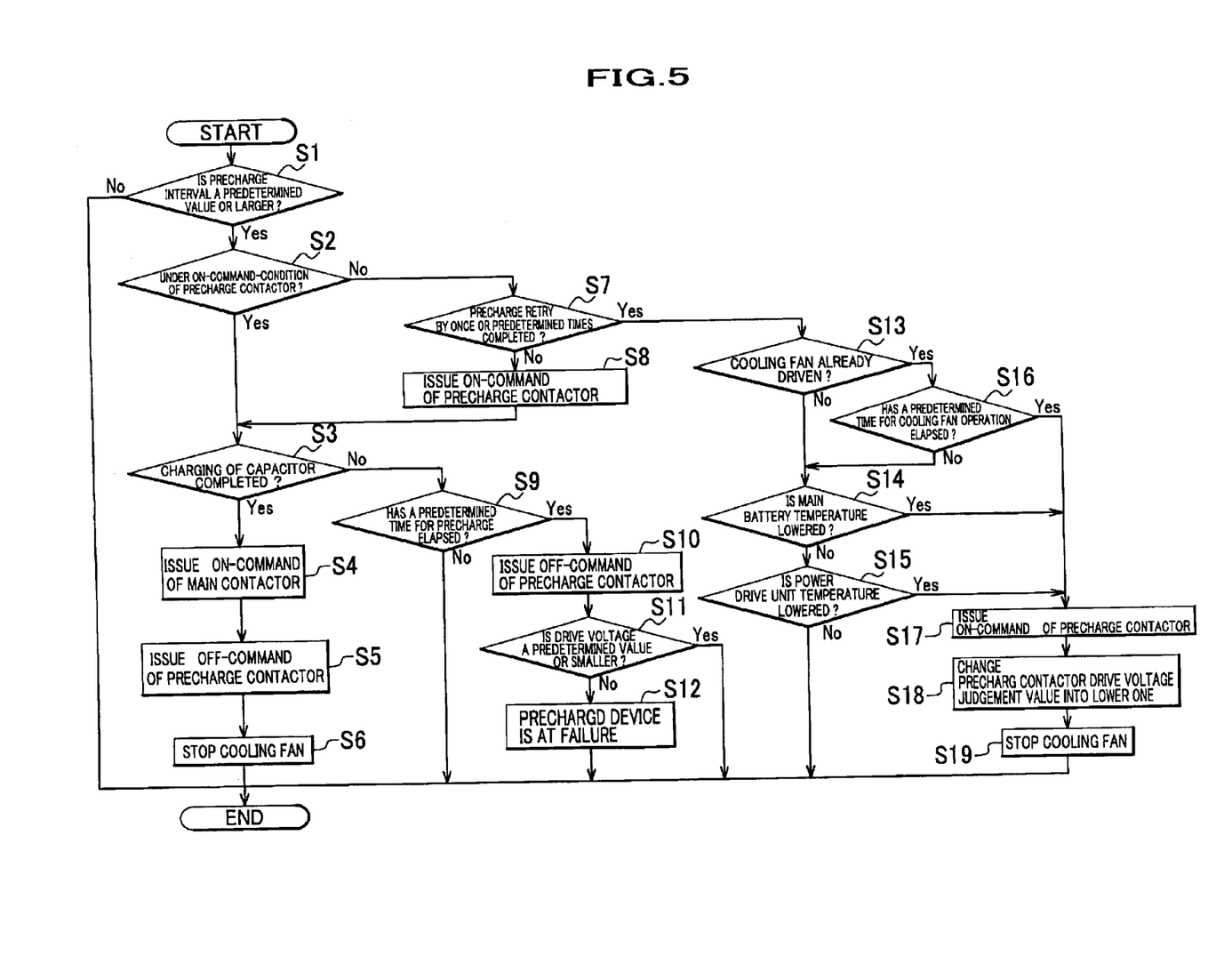

As shown in FIG. 5, control unit 15 judges whether or not a precharge interval is a predetermined value or larger at step S1, the precharge interval to be defined by considering the cooling time of precharge contactor 10b in view of a previous charging processing of capacitor 9 in order to prevent current-restriction resistor 10c in precharge circuit 10d from being burned-out in precharge circuit 10d. At step S1, if the precharge interval is a predetermined value or larger, then control unit 15 judges whether or not on-command (also called "drive signal") is outputted to precharge contact 10b at step S2. Alternatively, if control unit 15 judges that the precharge interval is smaller than a predetermined value at step S1, this routine is once completed and thereafter this routine is restarted.

If control unit 15 judges that on-command is outputted to precharge contactor 10b at step S2, control unit 15 judges whether or not charging of capacitor 9 is completed, in other words, whether or not charging of capacitor 9 is completed until voltage V2 of capacitor 9 is up to a predetermined value or more at step S3. If control unit 15 judges that charging of capacitor 9 is completed at step S3, after on-command is outputted to main contactor 10a at step S4, off-command is outputted to precharge contactor 10b at step S5 and thereafter cooling fan 18 is stopped at step S6.

If control unit 15 judges that on-command has not been outputted to precharge contactor 10b at step S2, control unit 15 judges whether or not retry of the initial charging using above-mentioned initial charging retrying unit is executed by a number of predetermined times at step S7. If control unit 15 judges that the retry of the initial charging is not executed at step S7, after on-command is outputted to precharge contactor 10b at step S8 and thereafter advancing to step S3.

If control unit 15 judges that charging of capacitor 9 is not completed at step S3, in other words, if control unit 15 judges that voltage V2 of capacitor 9 is below a predetermined value, control unit 15 judges whether or not on-command is outputted to precharge contactor 10b continuously for predetermined time, in other words, whether or not predetermined time necessary for precharge has elapsed at step S9. If control unit 15 judges that the predetermined time necessary for precharge has not elapsed at step S9, this routine is once completed and thereafter this routine is restarted.

If control unit 15 judges that the predetermined time necessary for precharge has elepsed at step S9, after off-command is outputted to precharge contactor 10b at step S10, control unit 15 judges whether or not voltage V3 of sub battery 6 is a predetermined value, in other words, whether or not the drive voltage of drive coil 10f is a predetermined value (also called "judgment threshold value") or smaller at step S11. Here, the judgment threshold value depends on the drive voltage of drive coil 10f. For example, at the time when ignition switch 21 is turned on, the drive voltage threshold value of drive coil 10f is referred as an initial value.

If control unit 15 judges that if the drive voltage is not a judgment threshold value or smaller at step S11, control unit 15 judges that precharge contactor 10b is at fail at step S12 and the routine is completed. If control unit 15 judges that the drive voltage is a judgment threshold value or smaller at step S11, this routine is once completed and thereafter this routine is restarted.

If control unit 15 judges that retry of precharge is executed by a number of predetermined times at step S7, then control unit 15 judges whether or not cooling fan 18 has been operated at step S13. If control unit 15 judges that cooling fan 18 has not been operated at step 13, control unit 15 judges whether or not temperature of power drive unit 8 is a predetermined value or smaller at step S15. If control unit 15 judges that the temperature of power drive unit 8 is not a predetermined value or smaller at step S15, this routine is once completed and thereafter this routine is restarted.

If control unit 15 judges that cooling fan 18 has been already operated at step S13, control unit 15 judges whether or not predetermined time of drive of cooling fan 18 has elapsed from the start-up at step S16. If control unit 15 judges that cooling fan 18 has not being driven for predetermined time at step S16, thereafter advancing to step S14. If control unit 15 judges that cooling fan 18 has been driven for predetermined time or if control unit 15 judges that temperature of main battery 1 has been at or below a predetermined value at step S16 or if control unit 15 judges that temperature of power drive unit 8 has been at or below a predetermined value at step S15, on-command is outputted to precharge contactor 10b at step S17. At step S18 after step S17, after the judgment threshold value for comparing this judgment threshold value with the drive voltage at step S11 is replaced by a moving voltage threshold value lower than the previous value calculated based on an output value from either temperature sensor 17 or 27, cooling fan is stopped at step S9.

Next, it will be explained about a specific example of the routine, referring to FIG. 5 to FIG. 7. First, it will be explained about an effect of execution of retry using initial charging retrying unit 15B in a case where a voltage-drop of sub-battery 6 occurs when ignition switch 21 is turned on. The below-mentioned processing corresponds to one aspect of the invention. Additionally, hereinafter, because cooling using cooling fan 18 is not necessary, it is assumed that cooling fan 18 is not driven also after ignition switch 21 is turned on.

[Flow A]

Figure 6:
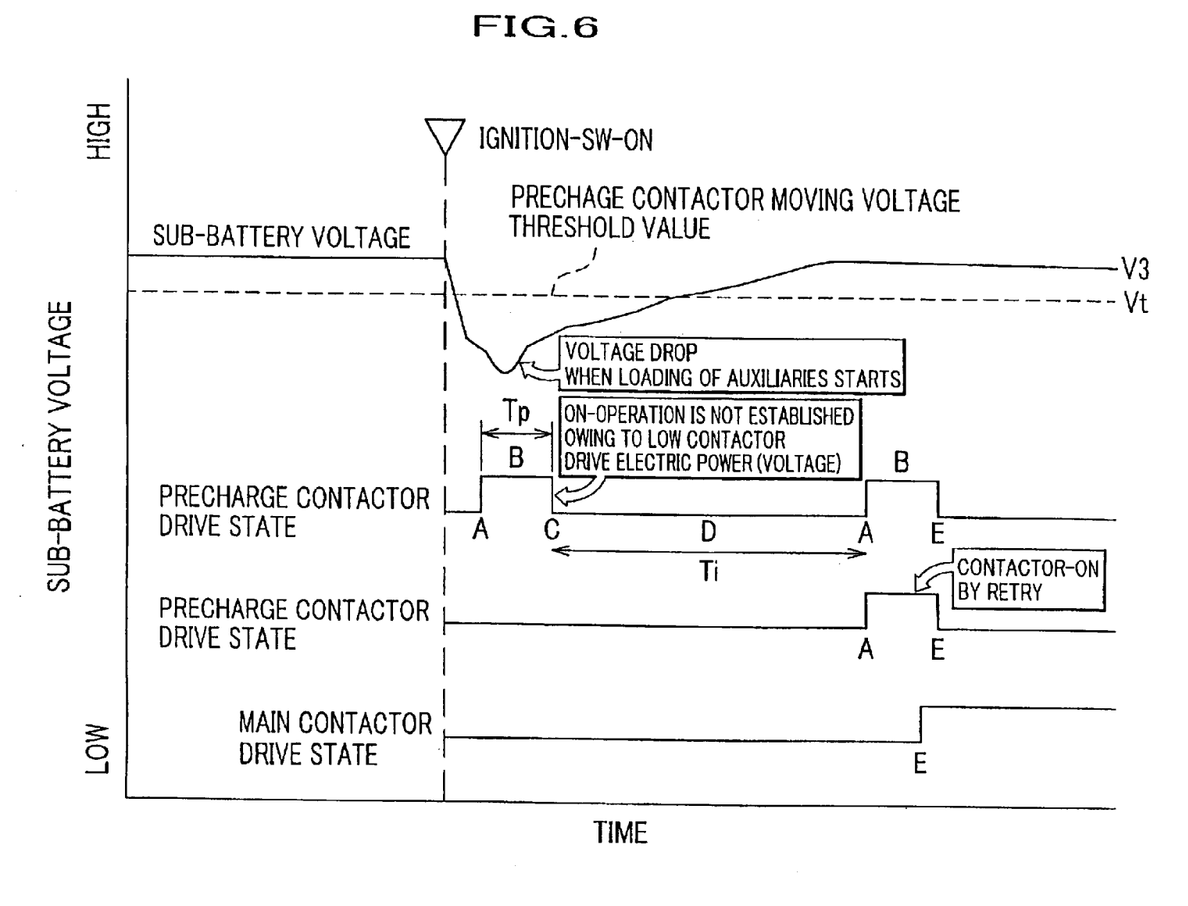

If ignition switch 21 is turned on as shown in FIG. 6, in control unit 15 the present step advances to step S8 by way of steps S1, S2, and S7. At step S8, a first time on-command is outputted to precharge contactor 10b. Then, precharge contactor 10b is turned not on, because voltage V3 of sub-battery 6 becomes lower than moving voltage threshold Vt owing to a voltage-drop. A processing following step S8 advances to the routine by way of steps S3 and S9.

[Flow B]

Next, for predetermined time Tp required for precharge, processing of steps S1, S2, S3, and S9 are repeated.

[Flow C]

after predetermined time Tp elapses, which is required for precharge, off-command is outputted to precharge contactor 10b at step S10. Thereafter, the present step returns to the routine by way of step S11.

[Flow D]

Next, control unit 15 judges that "No" judgment is outputted at step S1, until the above-mentioned precharge interval becomes a predetermined value Ti or more, and any processing is not executed, pausing the present step processing.

If the precharge interval becomes a predetermined value Ti or more, then the present step advances to step S8 by way of steps S1, S2, and S7. Second time on-command is outputted to precharge contactor 10b at step 8. Then, voltage V3 of sub-battery 6 is recovered into an original voltage so that voltage V3 becomes more than moving voltage threshold value Vt, resulting in that precharge contactor 10b is turned on and capacitor 9 is charged.

[Flow E]

If charging of capacitor 9 is completed at step S3, repeating Flow B, the routine is completed by way of steps S4, S5, and S6.

Next, before ignition switch 21 is turned on, it will be explained about an effect of execution of retry by the above-mentioned cooling initial charging unit 15c in a case where moving voltage threshold value Vt of precharge contactor 10b becomes more than voltage V3 of sub-battery 6.

Figure 7:
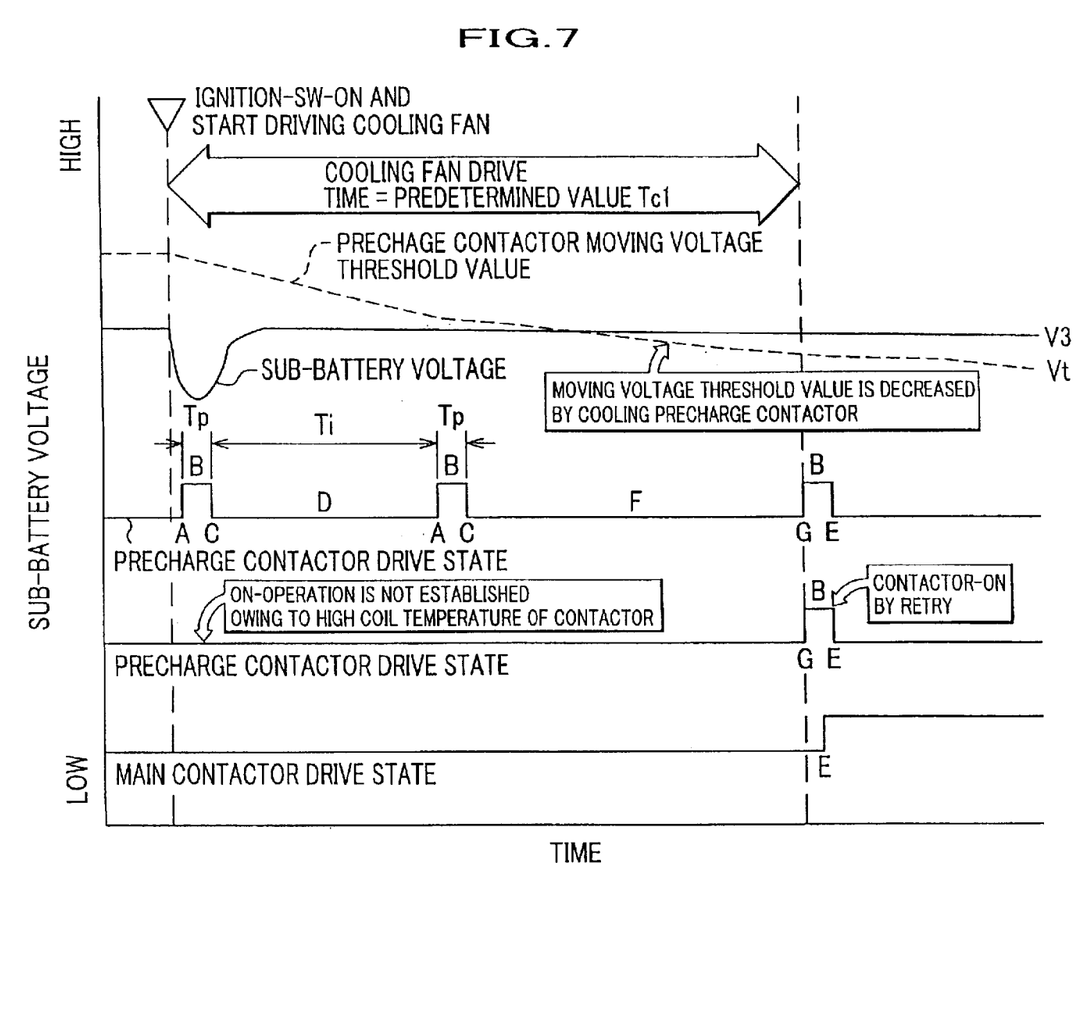

As shown in FIG. 7, if ignition switch 21 is turned on, cooling fan 18 is driven, resulting in that moving voltage threshold value Vt of precharge contactor 10b is gradually decreased. In control unit 15, following processing is executed in a same way as above. First, a first time on-command is outputted to precharge contactor 10b (refer to Flow A to Flow C). Then, because voltage V3 of sub-battery 6 becomes lower than moving voltage threshold value Vt is applied thereto, precharge contactor 10b is not turned on. After the precharge interval becomes a predetermined value Ti or more (refer to Flow D), a processing is executed in a same way as above-mentioned. The second on-command is outputted to precharge contactor 10b (refer to Flow A to Flow C). Then, precharge contactor 10b is not turned on, because voltage V3 of sub-battery 6 becomes smaller than moving voltage threshold value Vt.

[Flow F]

The present step also advances to step S7. Then, at step S7 control unit 15 judges that retry of execution of precharge is completed by a predetermined number of times, e.g. which is two times in this embodiment, the present step advances to step S16 by way of step S13. Until the drive time of cooling fan 18 becomes a predetermined value Tc1, a step following step S16 returns to the routine byway of steps S14 and S15. Thereafter, processing of steps S1, S2, S7, S13, S16, S14, and S15 is repeated.

[Flow G]

Next, if drive time of cooling fan 18 becomes a predetermined value Tc1, on-command is outputted to precharge contactor 10b at step S17. Then, because voltage V3 of sub-battery 6 becomes larger than moving voltage threshold voltage Vt, resulting in that precharge contactor 10b is turned on. Accordingly, following step returns to the routine by way of steps S18 and S19. On-command is outputted to main contactor 10a at step S4 by way of steps S1, S2, and S3 and the present step is completed by way of steps S5 and S6 (refer to Flow E). Above-mentioned processing corresponds to processing of one of aspects of the present invention.

If moving voltage threshold value Vt is smaller than a predetermined value (voltage V3 of sub-battery 6) until the drive time of cooling fan 18 becomes a predetermined value Tc1, in other words, if temperature of main battery 1 or power drive unit 8 is lowered down to a predetermined value, then precharge contactor 10b is turned on before the drive time of cooling fan 18 becomes a predetermined Tc1 (refer to S14, S15, and S17), resulting in that precharge contactor 10b can be turned on in earlier stage. This processing corresponds to processing of one of aspects of the present invention.

As apparently understood from the above description, the first embodiment provides following constitutions and operations.

According to the first aspect of the present invention, there is provided a power supplying apparatus used for a vehicle drive having: a motor that assists an engine that outputs a driving force to the vehicle and/or drives the vehicle; a first charging device that supplies an electric power to the motor; a main contactor connected between the first charging device and the motor; a precharge circuit including a precharge contactor connected in parallel with the main contactor and a current-restriction resistor; a power drive unit including a switching circuit disposed at an input side of the motor in which plural switching elements are connected; a capacitor connected in parallel at an input side of the power drive unit; a second charging device that supplies a drive voltage that is smaller than a voltage of the first charging device at least to a drive coil of the precharge contactor; an intial charging unit for supplying the drive voltage to the drive coil so that a voltage of the capacitor becomes a predetermined value or larger by closing the precharge contactor; and an initial charging retrying unit that retries to execute an initial charging after the initial charging is once stopped and predetermined time elapses if a voltage across the capacitor is less than a predetermined value and if a voltage at the second charging device is a predetermined value or smaller.

In view of the first aspect, following effects can be attained. The initial discharging unit supplies the drive voltage at the second charging device to the drive coil, resulting in that the precharge contactor is inactivated and charging operation is executed at a predetermined interval so that the voltage across the capacitor becomes a predetermined value or larger. After charging time by the initial charging unit has elapsed at a predetermined interval, in a case where the voltage across the capacitor is smaller than a predetermined value and the voltage at the second charging device is smaller than a predetermined value and the voltage from the second charging device is a predetermined value or smaller, the initial charging is retried to be executed at a predetermined interval. Accordingly, e.g. if a predetermined value of a voltage at the second charging device is set as a moving voltage which can inactivate the precharge contactor, a voltage drop in the second discharging device occurs while the engine is being energized and the voltage becomes the moving voltage or smaller, resulting in that the precharge contactor is not normally on. Even in such a case, after the voltage is recovered into an original voltage value by the execution of the retry.

According to a second aspect of the present invention in accordance with the first aspect thereof, there is provided a power supplying apparatus used for the vehicle drive device having: a cooling fan that at least cools the precharge contactor to be driven since the ignition is turned on; and a cooling initial charging unit that retries to execute the initial charging after predetermined time elapses since the cooling fan starts to be driven.

In view of the second aspect, in addition to the first aspect, followings can be attained. If the ignition switch is turned on, firstly the cooling fan is driven so that the precharge contactor is cooled. If the time of execution of retry of the initial discharging using the initial charging retrying unit is over a predetermined number of times at a predetermined interval since the cooling fan starts to be driven, then the cooling initial charging retrying unit retries to execute the initial charging. In other words, e.g. if the temperature of the drive coil is extraordinarily risen at the time when the engine starts to be energized, the ignition switch is turned on while the drive coil is cooled using the cooling fan, so that the moving voltage of the precharge contactor is gradually decreased. If the precharge contactor is not on by execution of once-retry or more, after the cooling fan is driven at a predetermined interval, so that the drive coil is sufficiently cooled, the initial charging is retried to be executed using cooling initial charging unit.

According to a third aspect of the present invention in accordance with the first aspect thereof, there is provided a power supplying apparatus used for the vehicle drive device further having: a cooling fan that cools the precharge contactor and at least one of the power drive unit and the first charging device; a temperature detecting unit that detects temperature of the power drive unit or the first charge device; and a cooling initial discharging unit that retries to execute the initial charging if a number of execution of retry of initial charging with the initial charging retrying unit is over a predetermined numbers of times and a temperature detected using the temperature detecting unit becomes lower than a predetermined value after the cooling fan starts driving.

In view of the third aspect, in addition to the first aspect, following effects can be attained. If the ignition switch is turned on, the first cooling fan is driven, so that the precharge contactor and/or the power drive unit are/is cooled. Further, if a number of execution of retry of the initial charging using the initial charging retrying unit is over a predetermined number of times and the temperature detected using the temperature unit is lowered down to a predetermined value, since the cooling fan starts to be driven, then the cooling fan retries to execute initial charging. In other words, e.g. if the temperature of the drive coil is extraordinarily risen when the engine starts to be energized, then the ignition switch is turned on while the drive coil and the power drive are cooled by driving the cooling fan, so that the moving voltage of the precharge contactor is gradually decreased. Further, if the precharge contactor is not on even by a predetermined number of times of execution of retry using the initial charging retrying unit, the temperature of the power drive unit is detected using the temperature detecting unit, so that the temperature of the drive coil is indirectly measured and the cooling initial charging unit retries to execute the initial charging if the temperature is lowered down to a predetermined value.

According to a fourth aspect of the present invention in accordance with the first aspect thereof, there is provided a power supplying apparatus used for the vehicle drive device further having: a cooling fan that at least cools the prechage contactor; and a cooling initial charging unit that drives the cooling fan if a number of execution of retry of the initial charging is over a predetermined number of times and retries to execute the initial charging at a predetermined interval since the cooling fan starts to be driven.

In view of the fourth aspect, in addition to the first aspect, following effects can be attained. If a number of execution of retry of initial charging using the initial charging retrying unit is over a predetermined number of times, then the cooling fan is driven so that the precherge is cooled. Further, at a predetermined interval since the cooling fan starts to be activated, the cooling initial charging unit retries to execute the initial charging. In other words, e.g. if the precharge is not on even when initial charging using the initial charging retrying unit retries to execute by a predetermined number of times by extraordinary rising of temperature of the drive coil, then the cooling fan is driven while the drive coil of the precharge contactor is cooled. After the cooling fan is driven at a predetermined interval so that the drive coil is sufficiently cooled, the initial charging is executed to be retried using the cooling initial charging unit.

According to the above description, following effects can be obtained in the first embodiment.

(1) Even if a voltage drop of sub-battery 6 occurs when ignition switch 21 is turned on, precharge contactor 10*b* is turned on after the voltage is recovered into an original value after the retry is executed, resulting in preventing failure of precharge contactor 10*b* owing to a voltage drop of sub-battery 6 from being incorrectly judged.

(2) If precharge contactor 10*b* is not on even by a predetermined number of times of execution of retry using the initial charging retrying unit 15B, precharge retry is executed using the cooling initial charging unit 15C after cooling fan 18 has been driving for predetermined time so that drive coil 10*f* is sufficiently cooled, resulting in preventing working failure depending on rising of temperature of drive coil 10*f*. Further, cooling fan 18 is driven immediately when ignition switch 21 is turned on, resulting in that drive coil 10*f* can be cooled at an earlier stage so that time until precharge contactor 10*b* is turned on, can be shortened.

(3) If precharge contactor 10*b* is not on even by execution of retry by a predetermined number of times using the initial charging retrying unit 15B, precharge retry is executed using a cooling initial charging unit 15C after cooling fan 18 is driven and drive coil 10*f* is sufficiently cooled, resulting in preventing working failure owing to rising of temperature of drive coil 10*f*. Further, precharge retry is executed after it is estimated whether or not drive coil 10*f* is cooled down to a predetermined value in view of temperature of power drive unit 8 or main battery 1, resulting in that precharge retry can be executed immediately at the time when cooling is completed. Temperature sensors 17 and 27 detect temperatures of power drive unit 8 and main battery 1, resulting in that it does not become necessary to directly measure temperature of precharge contactor 10*b*, so that a whole system can be simplified.

(4) If a voltage of capacitor 9 is not over a predetermined value or more even after predetermined time elapses since execution of retry using the cooling initial charging unit 15C, control unit 15 judges whether or not precharge contactor 10*b* is at fault at step S12. In other words, control unit 15 judges that working failure of precharge contactor 10*b* is not owing to voltage drop of sub-battery 6 and not owing to rising of temperature of drive coil 10*f* but owing to any other cause, resulting in that precharge contactor 10*b* is at fault.

[Second Embodiment]

It will be explained about power supplying apparatus and method of a vehicle drive apparatus relating to the second embodiment, referring to drawings. The second embodiment is established by partly modifying a control method using control unit 15 in the first embodiment. The same reference numerals between the first and second embodiments are labeled, so that the explanation for the same reference numerals will be omitted hereinafter.

Figure 8:
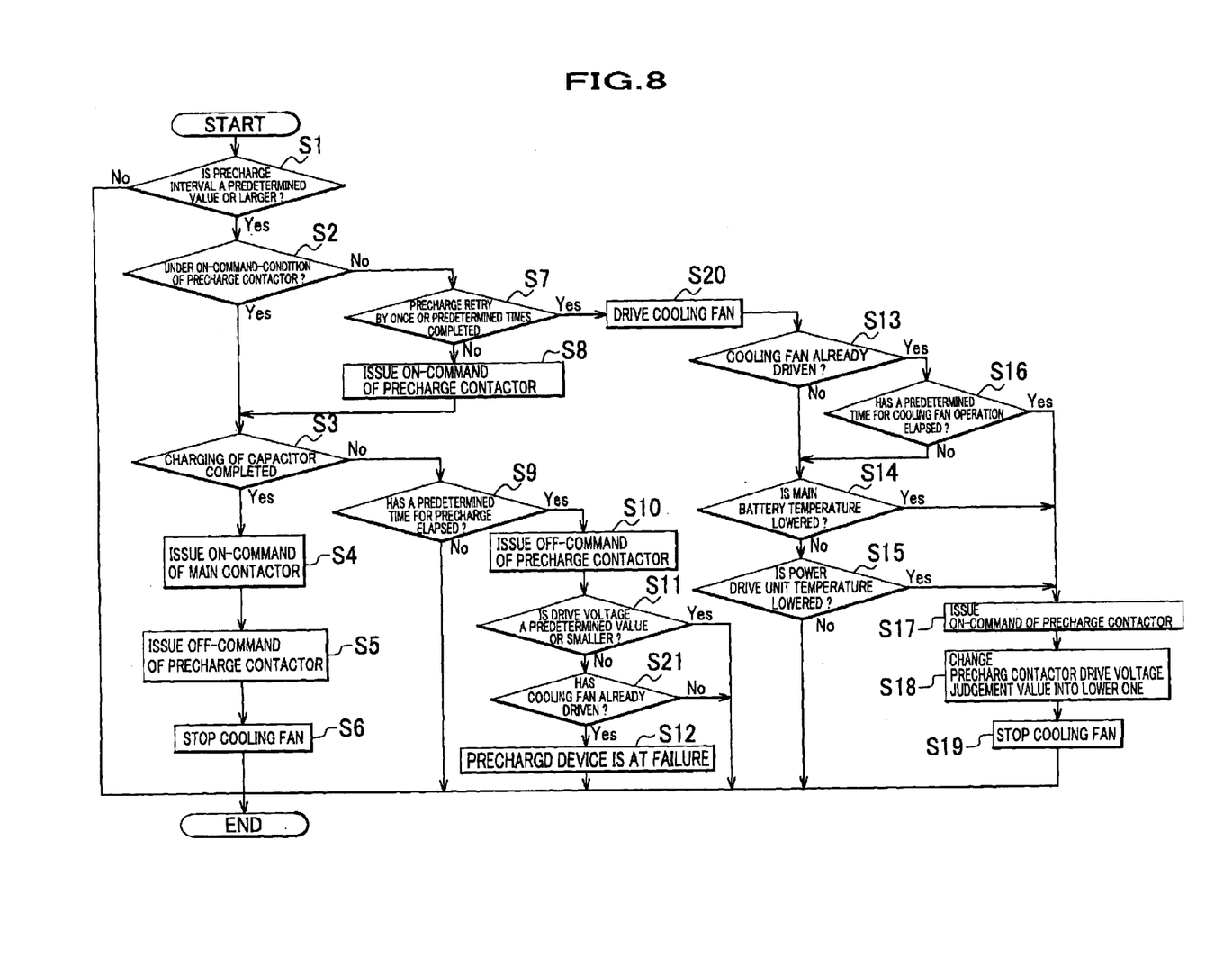
FIG. 8 is a flow chart for indicating a control method of driving the cooling fan after execution of retry using the initial charging retrying unit by a predetermined number of times.

The cooling initial charging unit 15C of control unit 15 outputs a cooling fan drive signal for driving cooling fan 18 if retry of initial charging using before-mentioned charging retry unit is executed over a predetermined number of times. In control unit 15, the routine as shown in FIG. 8 is executed. This routine is executed that a new step S20 for outputting the drive signal to cooling fan 18 is added between step S7 and step S13 in the before-mentioned routine, and a new step S21 for judging whether or not cooling fan 18 has been already driven is added to between step S11 and step S12.

Next, it will be explained about a specific example of the routine, referring to FIG. 8 and FIG. 9.

Figure 9:
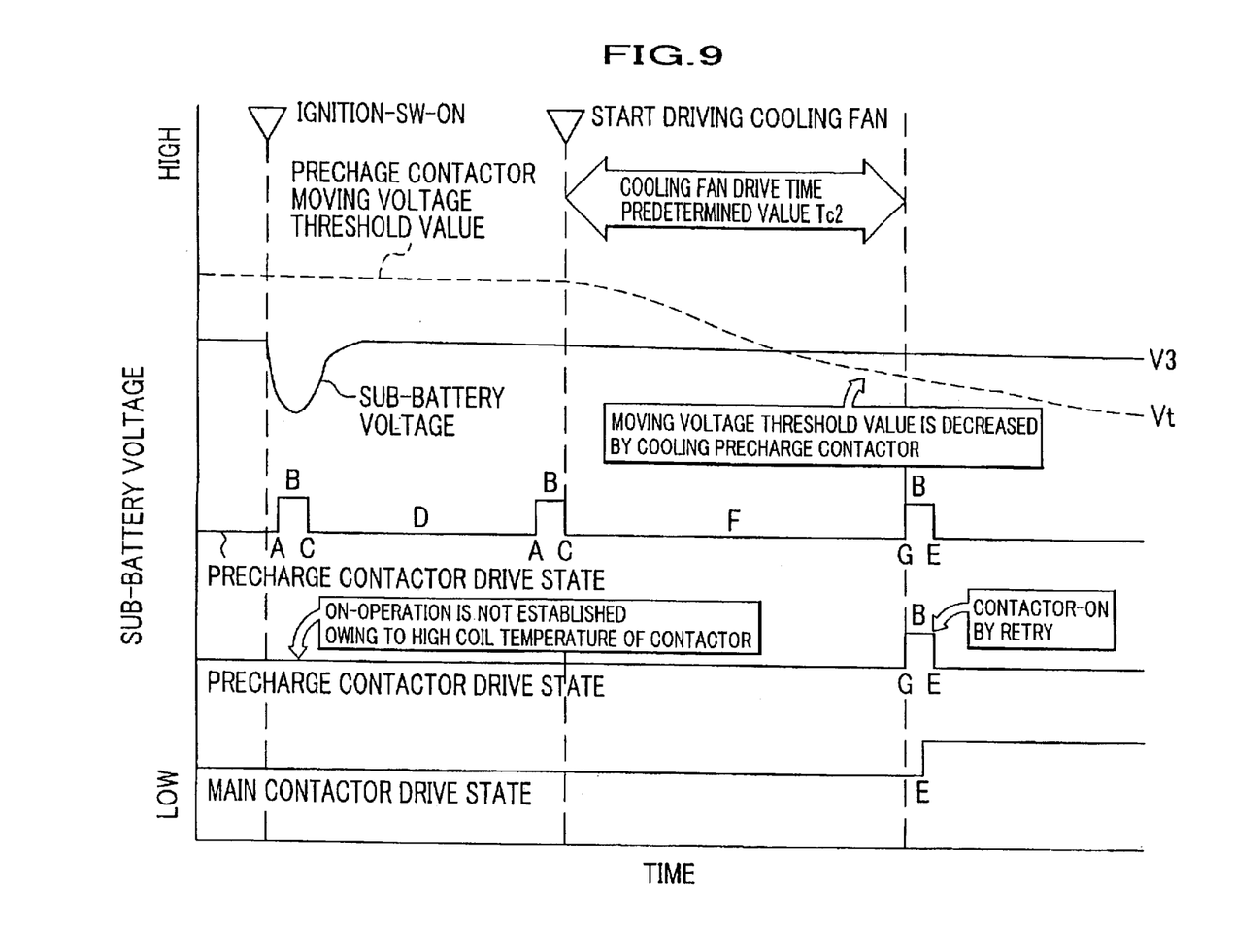
FIG. 9 is a flow chart for indicating an effect of execution of retry of the initial charging retrying unit when driving the cooling fan after the retry is executed using the initial charge retry by a predetermined number of times.

As shown in FIG. 9, if ignition switch 21 is turned on in control unit 15, the processing is executed in a same way as before. In a case where precharge contactor 10b is not on even if the second on-command is outputted (refer to the above-mentioned explanations about Flow A to Flow D and Flow A to Flow D), cooling fan 18 is driven at step S20. Thereafter, the present step advances to step S16 by way of step S13. The processing following step S16 returns to the routine by way of steps S14 and S15. Thereafter, processing of steps S1, S2, S7, S20, S13, S16, S14, and S15 is repeated.

If the drive time of cooling fan 18 reaches a predetermined value Tc2, on-command is outputted to precharge contactor 10b at step S17. Then, precharge contactor 10b is turned on (refer to the explanation about Flow G). Therefore, following processing returns to the routine by way of steps S18 and S19, because a voltage of sub-battery 6 becomes larger than the moving voltage threshold value. At step S4, on-command is outputted to main contactor 10a by way of steps S1, S2, and S3. The present processing is completed by way of steps S5 and S6 (refer to the explanations about Flow B and Flow E).

If precharge contactor 10b is not on even when the drive time of cooling fan 18 becomes a predetermined value Tc2, after again returning the routine, the present step advances to step S21 by way of steps S1, S2, S3, S9, S10, and S11. At step S12, control unit 15 judges that precharge contactor 10b is at fault.

Additionally, if moving voltage threshold value Vt is lowered down to a predetermined value until drive time of cooling fan 18 becomes predetermined value Tc2, in other words, if temperature of main battery 1 or power drive unit 8 is lowered down to a predetermined value defined by voltage V3 of sub-battery 6, precharge contactor 10b is made to be turned on before the drive time of cooling fan 18 becomes a predetermined Tc2 (refer to steps S14, S15, and S17), resulting in that precharge contactor 10b can be turned on at an earlier stage. The above-mentioned processing corresponds to processing of one aspect of the present invention.

As apparently understood from the above description, the second embodiment provides following constitutions and operations.

According to a fifth aspect of the present invention in accordance with the first aspect thereof, there is provided a power supplying apparatus used for the vehicle drive device further having: a cooling fan that at least cools the precharge contactor; and a cooling initial charging unit that drives the cooling fan if a number of execution of retry of the initial charging is over a predetermined number of times and retries to execute the initial charging at a predetermined interval since the cooling fan starts to be driven.

In view of the fifth aspect, in addition to the first aspect, followings can be attained. If a number when using the initial charging retrying unit is/are over a predetermined number of times, the cooling fan is driven. For example, when the power drive unit except for the precharge contactor is cooled using the cooling fan, if the temperature of the power drive unit detected using the temperature detecting unit is lowered down to a predetermined value or smaller after the cooling fan is driven, the cooling initial charging unit retries to execute the initial charging. In other words, e.g. if the precharge contactor is not on even when the initial charging using the initial charging retrying unit retries to execute by a predetermined number of times by extraordinary rising of the temperature of the drive coil, then the cooling fan is driven, resulting in that the drive coil of the precharge contactor and the power drive unit are cooled. The temperature of the power drive unit is detected using the temperature detecting unit, so that the temperature of the drive coil is indirectly measured. If the temperature is lowered down to a predetermined value, the cooling initial charging unit retries the initial charging.

According to sixth, seventh, eighth, or ninth aspect of the present invention in accordance with the second aspect thereof, there is provided a power supplying apparatus used for the vehicle drive device further having: a failure judgment unit that judges that the precharge contactor is at fault if a voltage across the capacitor is not a predetermined value or larger at a predetermined interval since the initial charging is executed using the cooling initial charging unit and a voltage at the second charging device is a predetermined value or larger.

In view of the sixth, seventh, eighth, or ninth aspect, in addition to the first aspect, following effect can be attained. If the voltage across the capacitor does not become a predetermined value or more even at a predetermined interval since the initial charge is executed using the cooling initial charging unit and the voltage at the second charging device is over a predetermined value or more, control unit 15 judges that the precharge contactor is at fault by the failure judgment unit.

According to the above description, following effect can be obtained in the second embodiment.

(5) Cooling fan 18 is driven after retries of precharge are executed by a predetermined number of times using the initial charge retrying unit and thereafter drive coil 10f, etc. of precharge contactor 10b are cooled, resulting in that consumption of electric power can be lessened in comparison with the case where ignition switch is turned on and simultaneously cooling fan 18 is driven.

While the invention has been described in detail with reference to specific embodiments thereof, it will be apparent to one skilled in the art that various changes and modifications may be made without departing from the scope of the claims.

For example, in the present embodiments, two temperature sensors 17, 27 are arranged in order to detect temperatures of both power drive unit 8 and main battery 1. The present invention is not limited to this aspect. Namely, any other constitutions are available, in which the temperature sensor may be arranged at one side selected of power drive unit 8 and main battery 1.

(Note that the disclosure of Japanese Patent Application No.2002-90560, filed on Mar. 28, 2002 is incorporated by reference.)

What is claimed is:

1. A power supplying apparatus for a vehicle drive comprising:
   a motor that assists an engine that outputs a driving force to said vehicle and/or drives said vehicle;
   a first charging device that supplies an electric power to said motor;
   a main contactor connected between said first charging device and said motor;

a precharge circuit including a precharge contactor connected in parallel with said main contactor and a current-restriction resistor;

a power drive unit including a switching circuit disposed at an input side of said motor in which plural switching elements are connected;

a capacitor connected in parallel at an input side of said power drive unit;

a second charging device that supplies a drive voltage that is smaller than a voltage of said first charging device at least to a drive coil of said precharge contactor;

an initial charging unit for supplying said drive voltage to said drive coil so that a voltage of said capacitor becomes a predetermined value or larger by closing said precharge contactor; and an initial charging retrying unit that retries to execute an initial charging after said initial charging is once stopped and predetermined time elapses if a voltage across said capacitor is less than a predetermined value and if a voltage at said second charging device is a predetermined value or smaller.

2. A power supplying apparatus for the vehicle drive device according to claim 1 comprising:

a cooling fan that at least cools said precharge contactor to be driven since an ignition switch is turned on; and a cooling initial charging unit that retries to execute said initial charging if a number of execution of retry of initial charging with said initial charging retrying unit is over a predetermined number of times and if predetermined time elapses after said cooling fan starts driving.

3. A power supplying apparatus for said vehicle drive device according to claim 1 comprising:

a cooling fan that cools said precharge contactor and at least one of said power drive unit and said first charging device and that starts driving when an ignition switch is turned on;

a temperature detecting unit that detects temperature of said power drive unit or said first charging device; and a cooling initial discharging unit that retries to execute said initial charging if a number of execution of retry of initial charging with said initial charging retrying unit is over a predetermined numbers of times and a temperature detected using said temperature detecting unit becomes lower than a predetermined value after said cooling fan starts driving.

4. A power supplying apparatus for said vehicle drive device according to claim 1 comprising:

a cooling fan that at least cools said prechage contactor; and a cooling initial charging unit that drives said cooling fan if a number of execution of retry of said initial charging is over a predetermined number of times and that retries to execute said initial charging after predetermined time elapses since said cooling fan starts to be driven.

5. A power supplying apparatus for said vehicle drive device according to claim 1 comprising:

a cooling fan that cools said precharge contactor and at least one of said power drive unit and said first charging unit;

a temperature detecting unit that detects temperature of said power drive unit or said first charging unit; and a cooling initial charging unit that drives said cooling fan if times of execution of retry of initial charging using said initial charging retrying unit is over a predetermined number of times and that executes to retry said initial charging if temperature detected using said temperature detecting unit is lowered down to a predetermined value or smaller.

6. A power supplying apparatus for said vehicle drive device according to claim 2 comprising:

a failure judgment unit that judges that said precharge contactor is at fault if a voltage across said capacitor is not a predetermined value or larger after predetermined time elapses since said initial charging is executed using said cooling initial charging unit and a voltage at said second charging device is a predetermined value or larger.

7. A power supplying apparatus for said vehicle drive device according to claim 3 comprising:

a failure judgment unit that judges that said precharge contactor is at fault if a voltage across said capacitor is not a predetermined value or larger after predetermined time elapses since said initial charging is executed using said cooling initial charging unit and a voltage at said second charging device is a predetermined value or larger.

8. A power supplying apparatus for said vehicle drive device according to claim 4 comprising:

a failure judgment unit that judges that said precharge contactor is at fault if a voltage across said capacitor is not a predetermined value or larger after predetermined time elapses since said initial charging is executed using said cooling initial charging unit and a voltage at said second charging device is a predetermined value or larger.

9. A power supplying apparatus for said vehicle drive device according to claim 5 comprising:

a failure judgment unit that judges that said precharge contactor is at fault if a voltage across said capacitor is not a predetermined value or larger after predetermined time elapses since said initial charging is executed using said cooling initial charging unit and a voltage at said second charging device is a predetermined value or larger.

10. A power supplying method for a vehicle drive device having a motor that assists an engine outputting a driving force of a vehicle or that drives a vehicle comprising:

a first step of supplying an electric power for driving said motor from said first charging device to a contactor unit in which a main contactor is connected in parallel with a precharge contactor with which a resistor that restricts current is connected in series;

a second step of supplying an electric power to at least said precharge contactor by outputting an electric power having a voltage lower than a voltage of said electric power of said first charging device by a voltage drop using said resistor from a second charging device that supplies a drive voltage to a drive coil of said precharge contactor;

a third step of supplying said electric power from said first charging device or said second charging device to a power drive with which a capacitor is connected in parallel, disposing at an input of said motor;

a fourth step of executing of initial charging of said capacitor by closing said precharge contactor while opening said main contactor if a voltage across said capacitor after supplying said drive voltage to said drive coil; and a fifth step of once stopping said initial charging by opening said precharge contactor if said voltage across said capacitor is less than a predetermined value and if said voltage of said second charging device is a predetermined value or more and further executing of retrying of said initial charging of said capacitor after predetermined time elapses.

11. A power supplying method according to claim 10 comprising:

a sixth step of cooling said precharge contactor and at least selected on of said power drive and said first charging device by driving a cooling fan from the time when an ignition switch of said vehicle is turned on;

a seventh step of detecting temperature of at least selected one of said power drive unit and said first charging device; and an eighth step of executing of retry of said initial charging if a number of execution of retry of initial charging using said initial charging retrying unit is over a predetermined numbers of times and that executes to retry said initial charging if temperature detected at said eighth step from the time when said cooling fan is lowered down to a predetermined value or smaller.

* * * * *